(12) United States Patent
Gupta

(10) Patent No.: US 11,925,938 B1
(45) Date of Patent: Mar. 12, 2024

(54) MICROREFINERY SYSTEM AND PROCESS FOR RECYCLING OF ELECTRONIC WASTE AND OTHER MIXED MATERIAL STREAMS

(71) Applicant: Determinant Materials, Inc., Pensacola, FL (US)

(72) Inventor: Nikhil Gupta, Monroe, CT (US)

(73) Assignee: Determinant Materials, Inc., Pensacola, FL (US)

( * ) Notice: Subject to any disclaimer, the term of this patent is extended or adjusted under 35 U.S.C. 154(b) by 148 days.

(21) Appl. No.: 17/209,902

(22) Filed: Mar. 23, 2021

Related U.S. Application Data

(60) Provisional application No. 63/037,879, filed on Jun. 11, 2020, provisional application No. 62/994,030, filed on Mar. 24, 2020.

(51) Int. Cl.
| | |
|---|---|
| *B02C 19/00* | (2006.01) |
| *B02C 19/18* | (2006.01) |
| *B02C 23/14* | (2006.01) |
| *B02C 23/16* | (2006.01) |
| *B02C 23/20* | (2006.01) |

(52) U.S. Cl.
CPC .......... *B02C 23/14* (2013.01); *B02C 19/0056* (2013.01); *B02C 19/186* (2013.01); *B02C 23/16* (2013.01); *B02C 23/20* (2013.01); *B02C 2023/165* (2013.01)

(58) Field of Classification Search
CPC ....... B02C 19/186; B02C 23/14; B02C 23/16; B02C 23/20
See application file for complete search history.

(56) References Cited

U.S. PATENT DOCUMENTS

| | | | | |
|---|---|---|---|---|
| 3,970,254 | A * | 7/1976 | Marsh | B02C 21/00 241/23 |
| 4,185,973 | A * | 1/1980 | Tester | B02C 18/0084 55/420 |
| 4,834,300 | A * | 5/1989 | Wojciechowski | B09B 3/00 241/257.1 |
| 5,078,965 | A * | 1/1992 | Pearson | A61L 2/202 210/195.3 |
| 5,678,773 | A * | 10/1997 | Takamura | B02C 19/0056 241/23 |
| 8,393,558 | B2 * | 3/2013 | Gitschel | B02C 23/14 241/DIG. 38 |

(Continued)

*Primary Examiner* — Faye Francis
(74) *Attorney, Agent, or Firm* — Whitmyer IP Group LLC

(57) ABSTRACT

A system for refining waste and other mixed material streams including a receptacle for receiving an input stream and a drill separating material from the input stream and outputting a processed stream. An incinerator incinerating the processed stream and outputting an incinerated stream. A mill grinding the incinerated stream and outputting a milled stream. A screen having screen holes filtering the milled stream and outputting a screened stream having particle sizes smaller than the screen holes. A mesh having holes smaller than the screen holes filtering the screened stream and outputting a meshed stream. A magnetic device removing magnetic particles from the meshed stream outputting a non-magnetic stream. A density separator receiving the non-magnetic stream and outputting a first output, a second output having a greater density than the first output, and a third output having a greater density than the second output.

19 Claims, 5 Drawing Sheets

(56) References Cited

U.S. PATENT DOCUMENTS

| | | | |
|---|---|---|---|
| 9,713,812 B1* | 7/2017 | Gitschel | B07B 15/00 |
| 10,279,510 B2* | 5/2019 | Tamir | B29B 17/02 |
| 2014/0191068 A1* | 7/2014 | Cheng | B02C 4/02 |
| | | | 241/75 |
| 2017/0209870 A1* | 7/2017 | Valerio | B03B 5/623 |
| 2020/0406268 A1* | 12/2020 | Hall | C02F 11/06 |

* cited by examiner

MICROREFINERY SYSTEM AND PROCESS FOR RECYCLING OF ELECTRONIC WASTE AND OTHER MIXED MATERIAL STREAMS

CROSS-REFERENCE TO RELATED APPLICATIONS

This patent application claims the benefit, under 35 U.S.C. § 119(e), of U.S. Provisional Application Ser. No. 62/994,030, filed on Mar. 24, 2020 and U.S. Provisional Application Ser. No. 63/037,879, filed on Jun. 11, 2020, the contents of which are incorporated herein by reference in their entirety.

TECHNICAL FIELD

The disclosure herein generally relates to systems and methods for recycling electronics and other mixed material streams. More specifically, the disclosure relates to the multistep process of taking mixed material streams and efficiently extracting various high value materials such as base metals, precious metals, metalloids, and hydrocarbons. The system uses a unique combination of refining processes to separate, concentrate, and purify these high value materials.

BACKGROUND

Recycling systems known in the art are cost prohibitive and only function on a mass scale.

Additionally, known systems in the art employ the use of chemicals which can be both toxic to machine operators and harmful to the environment.

Known systems in the art require a large footprint of land on which to operate.

Known systems in the art are not vertically integrated, i.e., able to take electronics and mixed material streams and process them to raw reusable materials without the need to import/export input/outputs to other systems.

Known systems in the art damage land, air, and/or water resources through their recycling process. As such, they fail to promote environmental safety and sustainability.

Known systems in the art are highly energy and resource intensive.

Thus, there exists a need for a manageable-scale, start-to-finish, recycling system. In addition, there exists a need for a recycling system that is environmentally friendly and resource and energy efficient.

SUMMARY

The system is environmentally friendly, recycles inputs where possible, minimizes the use of chemicals, and cleans outputs before they are put back into the environment. The system is of affordable cost and built to be scalable.

The needs set forth herein as well as further and other needs and advantages are addressed by the present embodiments, which illustrate solutions and advantages described below.

It is an object of the present teachings to provide a system that efficiently separates high value materials, such as precious metals, from medium value materials, such as base metals and metalloids, from relatively lower value materials such as plastics and polymers.

Another goal of the present teachings is to obtain high value materials and medium value materials, such as precious metals and base metals and metalloids for use in and/or to be sold as a final product, such as jewelry, including rings, necklaces, bracelets, earrings, and the like, as well as bullion for investment.

Another goal of the present teachings is to provide a system that promotes an environmentally conscience way of recycling mixed material streams.

Another goal of the present teachings is to provide a recycling system that has a small footprint and that occupies a relatively small area of land. The recycling system is configured to minimize any adverse impacts, and for example, it does not damage land, air, and/or water resources, and has net zero carbon emissions and zero wastes.

Another goal of the present teachings is to provide a low-cost system for recycling mixed material streams to limit the need for small, local communities to outsource processing and repurposing of mixed material streams to other states and/or nations.

Another goal of the present teachings is to provide a vertically integrated system able to completely recycle and refine electronics and/or other feedstocks.

Another goal of the present teachings is to provide a low capital expenditure (CapEx) recycling system that can be rapidly scaled to meet global recycling needs.

Another goal of the present teachings is to provide a recycling system that serves as a sustainable solution to the pressing problem of electronic and other mixed material waste.

Another goal of the present teachings is to provide a recycling system capable of accepting a variety of different types of inputs and input streams.

Another goal of the present teachings is to provide a recycling system capable of producing a variety of different outputs.

Another goal of the present teachings is to provide a recycling system that enables fully trackable, traceable, ethical, transparently produced materials. Such a system may be integrated with blockchain technologies as an external verification and immutable record of such a trackable, traceable recycling system.

Another goal of the present teachings is to provide a recycling system which reduces the material and energy consumption of current systems of producing materials through the unique combination of various recycling methods.

In one aspect, the recycling system has a receptacle for receiving an input stream. A drill receives the input stream and separates materials from the input stream and outputs a processed stream. An incinerator receives the processed stream and incinerates it to remove remaining organic material and embrittle the inorganic material and outputs an incinerated stream. A mill receives the incinerated stream from the incinerator and grinds it down, reducing the particle size of the material and outputs a milled stream. This material is then filtered by a screen with holes, where the material that fits though the holes is output as a screened stream and the material that does not is the first portion. A mesh having smaller holes than the screen holes, filters the screened stream and outputs a meshed stream. A magnetic device is used to remove magnetic particles and outputs a non-magnetic stream. A density separator receiving the non-magnetic stream and a liquid as a mixture, the mixture is separated into a first output, a second output having higher density that the first output, and a third output having greater density than the second output.

In one aspect, the recycling system has a reactor positioned with a proximal end above a heat source. The reactor receives a reactor input at a distal end of the reactor. The reactor reaches higher temperatures at the proximal end, closer to the heat source. The reactor rotates such that the reactor input moved from the distal end to the proximal end. The reactor input separates into a gaseous output and a solid output. The reactor input comprises limestone and silica and at least a portion of one of the input stream, the milled stream, the third output, and organic material removed by the drill.

In one aspect, the recycling system has a water recycling system including a first settling column receiving liquid from at least one of the milled stream, the first output, the second output, and the third output as a liquid input. Solids in the liquid input settle out and a first settled liquid is removed from the first settling column. A second settling column receives the first settled liquid and further settles solids out of the first settled liquid, and outputs a second settled liquid. A third settling column receives the second settled liquid and further settles solids out of the second settled liquid, and outputs a third settled liquid. A liquid filter removes remaining solids in the third settled liquid to provide a filtered liquid.

In one aspect, the recycling system has a receptacle for receiving printed circuit boards. A drill receives the printed circuit boards and separates them into an organic stream and a processed stream. A mill receives the processed stream and grinds it down to reduce the particle size, outputting a milled stream. A screen with holes receives the milled stream and filters the milled stream such that particles that do not pass through the screen holes are removed or re-milled and particles which pass though the screen holes are output as a screened stream. A mesh having holes smaller than the screen further filters the screened stream to output a meshed stream. A magnetic device passes through the meshed stream, removing magnetic particles, and outputting a non-magnetic stream. A density separator receiving the non-magnetic stream and a liquid as a mixture, the mixture is separated into a first output, a second output having higher density than the first output, and a third output having greater density than the second output. A reactor positioned with a proximal end above a heat source. The reactor receives a reactor input at a distal end of the reactor. The reactor reaches higher temperatures at the proximal end, closer to the heat source. The reactor rotates such that the reactor input moved from the distal end to the proximal end. The reactor input separates into a gaseous output and a solid output. The reactor input comprises limestone and silica and at least a portion of one of the input stream, the milled stream, the third output, and organic material removed by the drill. A condenser receives the gaseous output and applies a coolant to condense the gaseous liquid into a condensed output. A three-phase separator received the condensed output and separates it into water, liquid product, and vent gas. An oxidizer converts the vent gas into an oxidized gas. A gas filter, filters the oxidized gas and outputs a flue gas. The flue gas is analyzed by an analyzer, measuring the quantitative composition of the flue gas. The system also includes a first settling column receiving liquid from at least one of the milled stream, the first output, the second output, and the third output as a liquid input. Solids in the liquid input settle out and a first settled liquid is removed from the first settling column. A second settling column receives the first settled liquid and further settles solids out of the first settled liquid, and outputs a second settled liquid. A third settling column receives the second settled liquid and further settles solids out of the second settled liquid, and outputs a third settled liquid. A liquid filter removes remaining solids in the third settled liquid to provide a filtered liquid. At least one of the first settling column, the second settling column, and the third settling column, receives an additive to facilitate the precipitation of solids in their respective liquid. At least one of the first settling column, the second settling column, and the third settling column includes a solid filter that filters the respective settled liquid.

In one aspect, the recycling method includes receiving an input stream and drilling the input stream to separate materials from the input stream. Incinerating the input stream to further remove organic material and embrittle the remaining inorganic material and grinding the input stream in a liquid via a mill to reduce particle size of the input stream. Filtering the input stream via a screen to remove particles larger than 1.4 millimeters and then further filtering to remove particles larger than 149 micrometers. Applying a magnetic field to remove magnetic particles from the input stream and separating the input stream via a density separator and liquid to separate a desired component from the input stream by density.

In one aspect the recycling method includes after the step of separating the input stream, then settling solids out of the liquid from the input stream in a settling column to produce a settle liquid. Additives are mixed into the settling column to agglomerate and facilitate precipitation of additional solids from the settled liquid. The settled liquid is filter to remove solids, additional solids, and the additive to produce a filtered liquid.

DETAILED DESCRIPTION

Any of inputs and/or outputs described herein may be collected as a final product. It is not a requirement of the present teachings that an input be fully processed by each and every process described herein, and the outputs may be collected at any stage depending on various factors including but not limited to, efficiency, value of materials, and resource availability.

Figure 1:
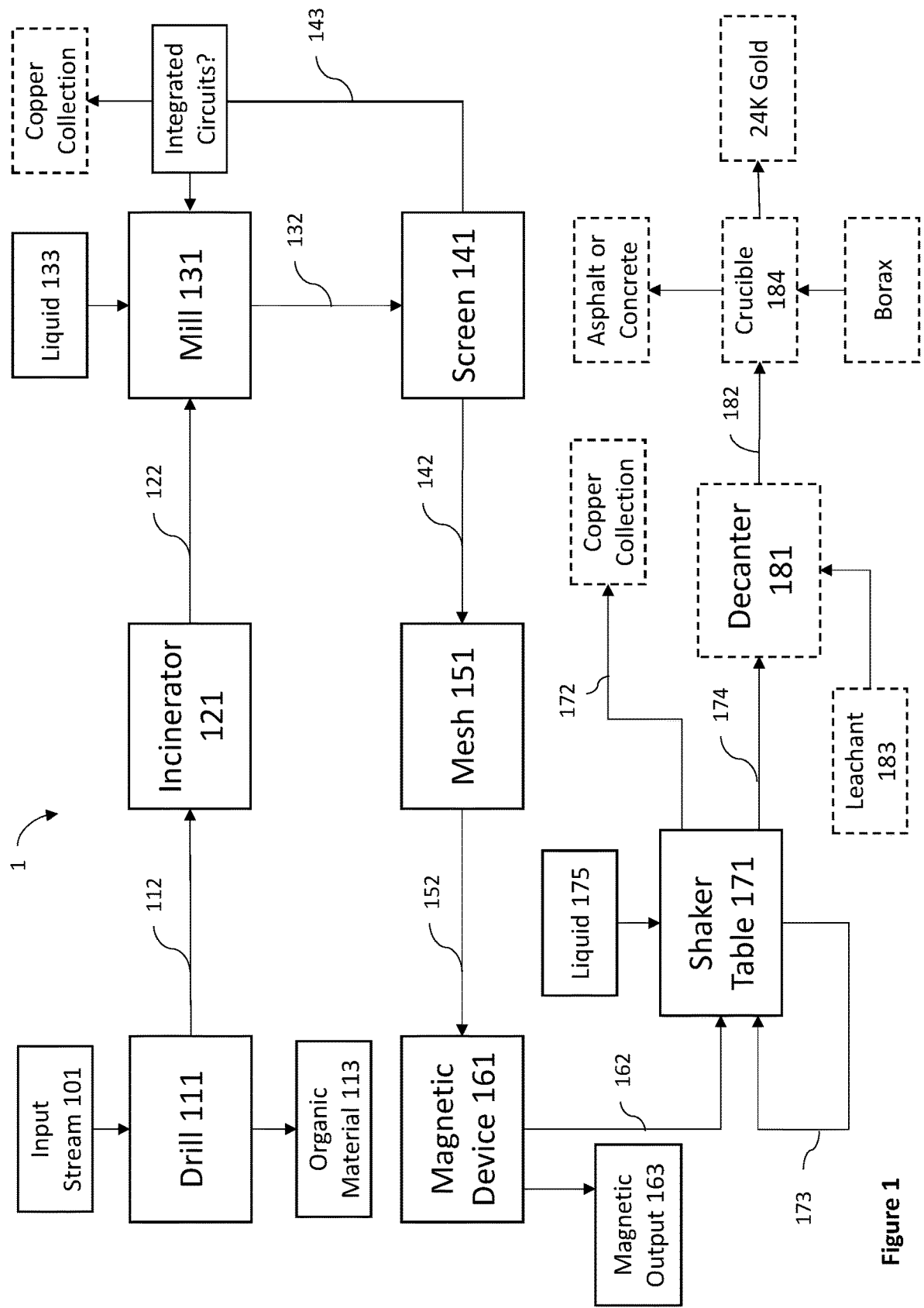
FIG. 1 is a schematic diagram depicting a recycling system according to the present teachings.

Referring to FIG. 1, shown is one embodiment of a recycling system according to the present teachings.

The system 1 may include a receptacle for receiving the input stream 101. The receptacle may be a conveyer, a bin, a chute, a drop-off point, or any other means for receiving materials.

The system 1 may also include a drill 111. The drill 111 may be a pneumatic drill, a hydraulic drill, a machine operated drill, a manually operated drill, or any drill capable of separating different materials of the input stream 101. The drill 111 may receive the input stream 101 and may output a processed stream 112.

It is understood that the drill 111 is one embodiment of separation that may be used in the system and is explained more fully herein for the purpose of demonstration not limitation. An oven, de-soldering solvents, vibratory separator, or other means of separation may be used in place of or in conjunction with the drill 111.

The system 1 may also include an incinerator 121. The incinerator 121 may be a kiln, an open flame incinerator, a covered flame incinerator, a gas-powered incinerator, an electric incinerator, a hearth, a dock incinerator, or any other incinerator. The incinerator 121 may receive the processed stream 112 and may output an incinerated stream 122.

The system 1 may also include a mill 131. The mill 131 may be a steel ball mill, a SAG mill, a hammer mill, a jaw crusher, or any other mill capable of reducing the particle size of an input. The mill 131 may receive the incinerated stream 122 and liquid 133 and may output a milled stream 132.

The system 1 may also include a screen 141. The screen 141 may be a metal screen, a fiberglass screen, a plastic screen, or any other screen having holes. The size of the holes may be of any suitable size to separate materials. The screen 141 may receive the milled stream 132 and may output a screened stream 142 and a first portion 143. The first portion 143 may be fed back into the mill 131 or removed from the system.

The system 1 may also include a mesh 151. The mesh 151, may have holes that are smaller than the screen 141. The mesh 151 may be a metal screen, a fiberglass screen, a plastic screen, or any other screen having holes. The size of the holes may be of any suitable size to separate materials. The mesh 151 may receive the screened stream 142 and may output a meshed stream 152.

The system 1 may also include a magnetic device 161. The magnetic device 161 may be neodymium iron boron magnet, samarium cobalt magnet, ceramic magnet, ferrite magnet, an electromagnet, a temporary magnet, a permanent magnet, or any other device capable of attracting magnetic materials, or any other desired materials. The magnetic device 161 may receive the meshed stream 152 and may output a non-magnetic stream 162 and a magnetic stream 163. The magnetic stream 163 may contain captured magnetic materials.

The system 1 may also include a shaker table 171. The shaker table 171 may be an electrodynamic shaker table, a servo-hydraulic shaker table, a mechanical shaker table, or any other platform capable of vibrating. The shaker table 171 may receive the non-magnetic stream 162 as a mixture with water or other liquids and may output a first output 172, a second output 173, and a third output 174.

It is understood that the shaker table 171 is one embodiment of a density separator that may be used in the system and is explained more fully herein for the purpose of demonstration not limitation. Panning, blue bowl, miller table, sluice, spiral concentrator, and other density separators may be use in place of or in conjunction with a shaker table 171.

The input stream 101 may be electronics or other mixed materials. For example, the input stream 101 may be printed circuit boards, integrated circuits, whole electronics, other electronic components, or commingled recycling.

The drill 111 may be bypassed by a size reduction grinding process, such as, for example, human labor manually separating the input, alternate input streams consisting of already separated materials, or an additional grinding step.

The drill 111 may separate materials of the input stream from each other. For example, the drill 111 may separate inorganic material from organic material 113 in an input, including the input stream 101. The drill 111 may separate any component/material of the input from any other component/material of the input.

The organic material 113 removed by the drill 111 from the input stream 101 may be plastic polymers.

The incinerator 121 may embrittle the materials from the input stream 101 or the processed stream 112 to ease the milling and grinding steps. In one embodiment the incinerator 121 operates at a temperature above 900 degrees Fahrenheit. In a preferred embodiment the incinerator 121 operates at a temperature between 900- and 1,000-degrees Fahrenheit. The incinerator 121 may be fed by an air blower and may include an after-burner baffle.

The incinerator 121 may be partially or fully fueled by the residual organic material in the processed stream 112 or by the removed organic material 113.

The hot combustion gasses produced by the incineration of the input stream 101 or other material by the incinerator 121 may be harnessed to generate electricity for the system 1. The hot gasses may, for instance, be routed through a steam generator for the production of high-pressure steam. The high-pressure steam may be used to spin a turbine and produce low-cost, green electricity to be used in the system 1. The hot gasses produced may also be used to de-solder the ICs from the PCBs.

The mill 131 may contain equal weights of incinerated stream 122 and ball bearings and may contain approximately 1 gallon of liquid 133 or as much liquid 133 as necessary to prevent dust from being emitted during the grinding by the mill 131. In one embodiment the mill 131 may contain varying ratios of the incinerated stream 122 and ball bearings depending on the material processed.

The mill 131 may receive the input stream 101.

In one embodiment, the mill 131 may be operated for approximately 30 minutes, or from approximately between 30 to 40 minutes, to reduce the particle size of the incinerated stream 122 or input stream 101. The mill 131 may be operated until the incinerated stream becomes a homogeneous mixture capable of passing through a 100 mesh.

In one embodiment, the screen 141 may have holes approximately 1.4 millimeters, or from approximately about 1.3 to 1.5 millimeters.

In one embodiment, the first portion 143 may comprise a high concentration of material that is desired to be removed from the system and is immediately and/or automatically removed. This material may be desired to be removed due to the value of the material, to promote efficiency in the system, or other criteria depending upon the system's intended goals. For example, if the input stream 101 is integrated circuits, the first portion 143 may comprise a high concentration of copper and may be immediately and/or automatically removed for collection. In another example if the input stream 101 contains large pieces of steel or aluminum, the first portion 143 may be immediately and/or automatically removed to promote efficient milling.

Copper removed from the system may be used in the production of jewelry, electronics in consumer, corporate, and government applications including defense, electrical wire of various applications including infrastructure, tubing and piping, among other applications. Steel removed from the system may be used in the production of vehicles of various type, infrastructure of various type, electronics in consumer, corporate, and government applications, and various materiel in defense applications, among other applications. Aluminum removed from the system may be used in the production of cans and bottles such as are used in the beverage industry, vehicles of various type, electronics in consumer, corporate and government applications, among other applications.

In one embodiment, the first portion 143 may comprise a low concentration of desired material and may be fed back into the mill 131 for further grinding.

In one embodiment, the mill 131 may grind the first portion 143 for approximately 10 minutes, or from approximately about 5 to 15 minutes, or until the milled stream's 132 particle size is small enough that it can pass through the screen 141.

In a preferred embodiment, the mesh 151 may be a 100-mesh screen having holes of 149 micrometers. In another embodiment, the mesh 151 may be an 80-mesh screen having holes of 177 micrometers. In another embodiment, the mesh 151 may not be larger than an 80-mesh screen. The particles may be broken down to the sizes disclosed above or other sizes to promote efficient density separation.

In one embodiment, the milled stream 132 may be passed through the screen 141 and the mesh 151, whereby large metal particles may be removed as the first portion 143. In another embodiment the milled stream 132 may be passed through the screen 141, whereby large metal particles may be removed as the first portion 143, the screened stream 142 may then be re-milled and passed though the mesh 151.

The magnetic device 161 may be passed through the meshed stream 152 attracting iron and other magnetic particles and removing them from the meshed stream 152. The magnetic device 161 may be positioned above a conveyer, attracting magnetic material, while the meshed stream 152 is moved below. The magnetic device 161 may be placed in a container of the meshed stream 152 and a liquid, attracting magnetic material for removal, the liquid may be water. The magnetic device may be configured to separate materials of specific magnetic properties, as desired.

The system 1 may also include an eddy current separator. The eddy current separator may be in addition to the magnetic device 161 or may be in place of the magnetic device 161. The eddy current separation may occur before or after separation by the magnetic device 161.

The shaker table 171 may have various grooves of differing depths and quantities, may be vibrated at varying intensities, and may include inclines of varying slope and length depending on the types of materials to be separated. Variables such as feed rate, liquid flow rate, type of liquid, slope/incline of the table, vibration frequency, groove dimensions, width of the table, and length of the table may be customized as desired.

For example, the shaker table 171 may be configured such that less dense particles of the non-magnetic stream 162 are suspended in liquid 133 and/or 175 that flows over the grooves. These less dense particles of the non-magnetic stream 162 may be collected as a first output 172. Particles denser than those in the first output 172 may be captured in the grooves and may be moved along the table up an incline, including in the grooves. The grooves may end where liquid 133 and/or liquid 175 are collected with the relatively less dense particles captured in the grooves of the shaker table 171. The relatively less dense particles in the grooves of the shaker table 171 may be captured as a second output 173. The second output 173 may be fed back into the shaker table to be further processed. The most dense particles on the shaker table 171 may be vibrated along the grooves and up an incline and collected as a third output 174.

In one embodiment, some, or all of the first output 172, second output 173, and/or third output 174 may be fed back into the shaker table 171 for further processing.

By way of further example, if the input stream 101 is integrated circuits, the first output 172 may contain copper and/or tailings consisting of plastic polymers, and the third output 174 may contain copper, silver, platinum, palladium, silicon and/or approximately 75% gold, about 18 karats, and/or a mixture of these materials. These materials may be used in and/or sold as a final product, such as jewelry, including rings, necklaces, bracelets, earrings, bullion for investment and savings, as well as in the use of electronics and defense applications, such as integrated circuits in consumer, corporate, and government applications, among other applications.

In yet another example, if the input stream 101 is integrated circuits and the mill 131 receives the input stream 101, the first output 172 may contain organic material. The organic material is not removed by the drill 111 or the incinerator 121 and may include plastic polymers, which may be recovered and used as fuel.

The second output 173 may contain a mix of materials in the first output 172 and the third output 174 and may be collected and sold as a final product.

Liquid that is utilized to produce the first output 172, the second output 173, and the third output 174 may be repurposed and used as liquid 133 and liquid 175.

Liquid 133 and liquid 175 may be water or any other liquid capable of being used in the recycling system. In a preferred embodiment the liquid may be a non-viscus liquid. Liquid 133 may be the same or different than liquid 175.

The system 1 may also include a decanter 181. The decanter 181 may be a vat, drum, barrel, or any other container that can contain a leachant 183. The decanter 181 may receive the first output 172, the second output 173, the third output 174, and/or a combination of the above, as well as the leachant 183. The leachant 183 may be a leachant, a precipitant, or other solution capable of removing a portion of the output received by the decanter 181. The leachant 183 may leach or precipitate one or more elements out of the output received by the decanter 181. The leached or precipitated parts of the output received may be removed from the decanter 181 and leave behind a decanted solid 182. In one embodiment the decanter 181 may receive the third output 174.

The system 1 may also include a crucible 184. The crucible may be a graphite crucible, a ceramic crucible, or any other crucible capable of containing a borax melt. The decanted solid 182 may be combined with borax in the crucible 184. The mixture of the decanted solid 182 and borax may be heated whereby the borax melt will remove one or more elements from the mixture.

For example, if the input stream 101 is integrated circuits, the leachant 183 may remove the silver, platinum, and copper from the third output 174 and leave a decanted solid 182, which may be a mixture of gold and silica. Borax may be added to the decanted solid 182 in the crucible 184 and heated producing a molten phase of 99.99% gold, 24 karats, and silica slag. The silica slag may be used in the production of concrete or asphalt. The heating element for the borax melt may be from an external source, heat from the incinerator 121, or from the same heating source as the incinerator 121.

The concrete produced by the system may be used in the production of infrastructure such as buildings and bridges, among other applications. The asphalt produced by the system may be used in the production of infrastructure such as roads and roofing tiles, among other applications.

It is understood that the decanter 181, the leachant 183, crucible 184, and the borax melt are one embodiment of a metal refining process and is explained in detail for the purpose of demonstration not limitation. Cupellation, for example MgO cupellation, or other metal refining processes may replace or supplement the leachant 183, decanter 181, crucible 184, and borax melt.

Figure 2:
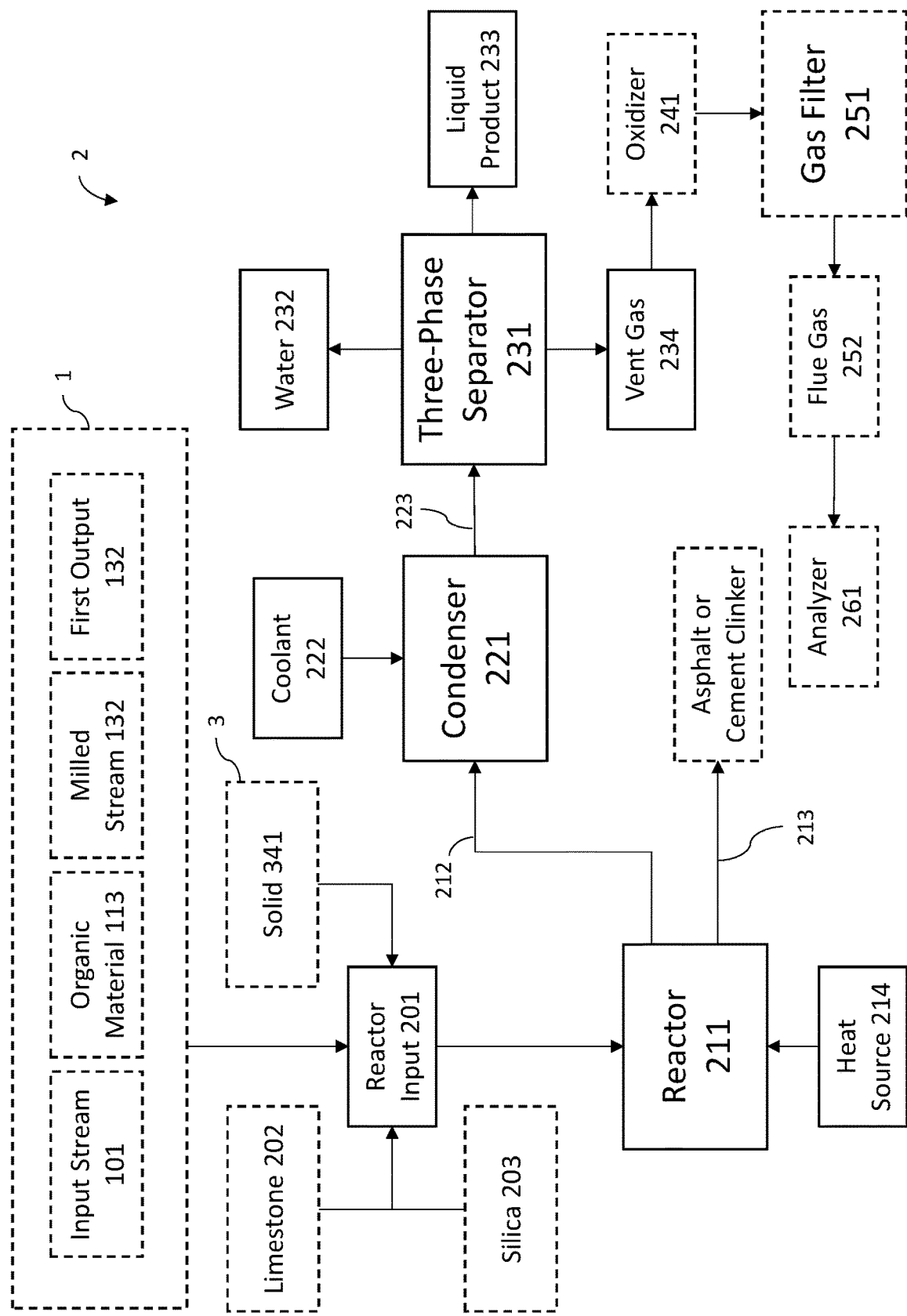
FIG. 2 is a schematic diagram depicting a reactor included in the recycling system according to the present teachings.

Referring to FIG. 2, shown is one embodiment of a reactor included in the recycling system according to the present teachings.

The system 2 may include each of the elements of system 1 and also include a reactor 211. The reactor 211 may be a rotary cement kiln or other reactor capable of having a higher temperature gradient at one end that a reactor input 201 moves towards. The reactor 211 may receive the reactor input 201 at the opposite end as the heat source 214 and may output a gaseous output 212 and a solid output 213.

The system 2 may also include a condenser 221. The condenser 221 may be an overhead condenser, a heat exchanger such as a shell and tube heat exchanger, a condenser cooled by a refrigerant and refrigeration compressor system, or other condenser capable of cooling gases to liquid products. The type of condenser may depend on fouling concerns, among other factors. The condenser 221 may receive the gaseous output 212 and a coolant 222.

The system 2 may also include a three-phase separator 231. The three-phase separator 231 may be a drum or other container with a liquid level, a gas level, and a water boot and may output water 232, liquid product 233, and vent gas 234.

The reactor input 201 may be the input stream 101, organic material 113 left behind by the drill 111, limestone (calcium carbonate) 202, silica 203, the milled stream 132, the first output 172, solids 341 or any combination of the above.

The heat source 214 may be a burner tip and may be fueled by an oxidant and natural gas, or other suitable fuel source. The oxidant may be air. The natural gas and oxidant may be mixed in a mixing line or may be injected straight into the reactor 211.

The reactor 211 may have a temperature gradient whereby the reactor 211 is hotter closer to the heat source 214. The temperature near the heat source 214 may reach temperatures in excess of, for example, 3,500 degrees Fahrenheit. The temperature of the reactor 211 may change depending upon the fuel source and oxidant used by the heat source 214. The temperature may change depending upon the reactor input 201.

The reactor 211 may be angled and rotated such that the reactor input 201 travels down the side of the reactor 211 towards the heat source 214.

The reactor input 201 may travel down the side of the reactor 211 being heated by gases traveling up the reactor 211.

Within the reactor 211 there may be a gas gradient whereby methane and oxygen are concentrated at the bottom of the reactor 211, carbon monoxide and hydrogen at the middle of the reactor 211, and carbon dioxide and steam at the top of the reactor 211. For example, near the top of the reactor 211, where steam is concentrated, steam cracking and hydrolysis reactions are more pronounced, representing carbon rejection reactions, whereby light hydrocarbons are formed through the coking of the solid material. At the middle of the reactor 211, hydrogen promotes hydrocracking of the solid material, removing coke and adding hydrogen to form additional light hydrocarbons. At the bottom of the reactor 211, with oxygen concentrated, combustion dominates the reaction, destroying any remaining organic material 113.

In one embodiment limestone 202 may travel down the reactor 211 with the other components of the reactor input 201. The heat of the reactor 211 may decompose the limestone 202 into calcium oxide (CaO—quicklime). This calcium oxide may act as a catalyst to promote various cracking reactions of the organic materials. The calcium oxide may heat in the presence of water and silica 203 and may produce calcium hydroxides and calcium silicates (cement clinker/asphalt) in hydration and curing reactions. There may be a gradient of solids in the reactor 211, whereby limestone 202 may be at the top of the reactor 211, calcium oxide may be in the middle of the reactor 211, and fused cement clinker/asphalt may be at the bottom of the reactor 211. The limestone 202 and associated calcium compounds may serve to neutralize acid gasses and may promote catalytic cracking of organic molecules, while the cement clinker/asphalt may absorb heavy metals.

The counter-current flow of falling solids and rising gases, may enable a heat/temperature gradient within the reactor. This is more robust and may enable the application of the specific cracking temperature needed to break off carbon and hydrogen from each organic molecule. The temperature gradient may prevent wasteful thermal cracking and over-cracking and may serve as a quench, preventing recombination reactions, among other benefits.

The gaseous output 212 may be oxygen, nitrogen, methane, carbon monoxide, hydrogen, steam, carbon dioxide, and/or various mixed hydrocarbons of varying geometry and chain length, among other species.

The gaseous output 212 may be harnessed to generate electricity. The gaseous output 212 may, for instance, be routed through a steam generator for the production of high-pressure steam. The high-pressure steam may be used to spin a turbine and produce low-cost, green electricity.

The solid output 214 may be asphalt or cement clinker if the reactor input 201 contains limestone 202 and silica 203. Silica 203 may be added to the reactor or it may already be present in other components of the reactor input 201.

The coolant 222 may be water, a refrigerant from a refrigeration compressor system, or any other suitable coolant. If the coolant 222 is water, it may be 77 degrees Fahrenheit or ambient air temperature. The condenser 221 may raise the temperature of the coolant 222. The temperature may be raised by approximately 20 to 50 degrees Fahrenheit.

The three-phase separator 231 separates the condensed output 223 whereby the liquid product 233 may be liquid hydrocarbons, and water 232 may be drained off. The liquid product 233 may be a mixture of benzene, toluene, xylene, high octane fuel, or other liquid for fuels and/or chemical production. In the three-phase separator 231 heavy hydrocarbons may condense into a liquid whereby liquid water may collect at the bottom of the condenser and may be drained off.

These liquid products may be used in the production of fuels and chemicals, such as gasoline, diesel, jet fuel, kerosene, styrenics and phenols, among other applications.

The vent gas 234 may be fed back into the condenser 221 or another condenser for further condensing. The vent gas 234 may be expelled into the atmosphere.

The system 2 may also include an oxidizer 241. The oxidizer 241 may receive the vent gas 234 and oxidize any remaining unoxidized material.

The system 2 may also include a filter 251. The filter 251 may be a scrubber with water, amine, or other solution capable of removing particles from the vent gas 234, activated charcoal, an electrostatic precipitator, a bag filter, or other gas cleaning device. The filter 251 may receive vent gas 234, the vent gas 234 may be oxidized by the oxidizer 241, and output flue gas 252.

The system 2 may also include an analyzer 261. The analyzer 261 may be a gas meter or other measuring device capable of measuring the types and amounts of particles in and/or composition of the flue gas. The flue gas 252 may be routed to the analyzer 261 before being released into the atmosphere. The analyzer 261 may measure particles in and/or composition of the flue gas 252 and depending upon the measurements may have the flue gas 252 pass though the filter 251 again. The analyzer 261 may measure the quantitative components of the flue gas 252.

Figure 3:
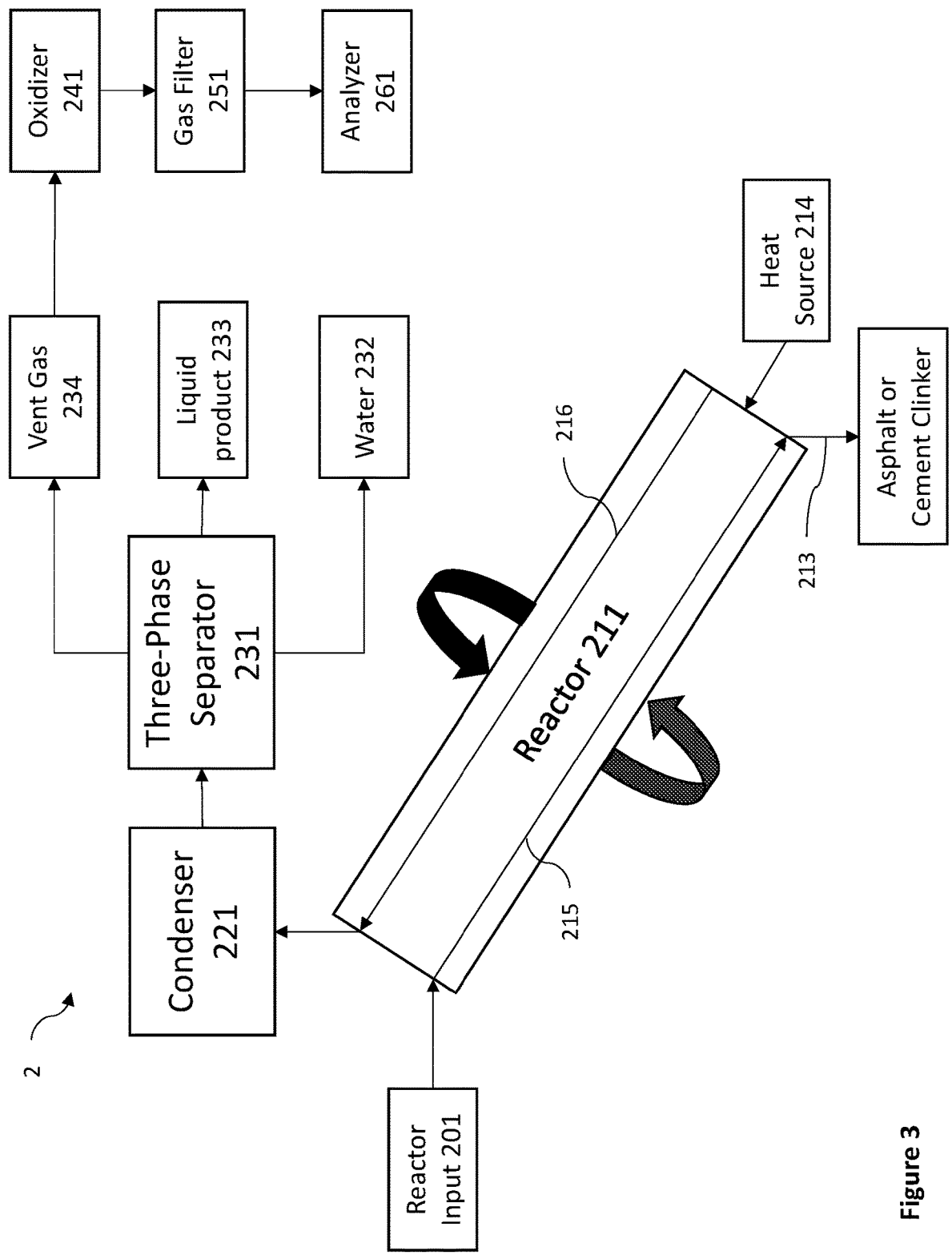
FIG. 3 is a drawing depicting the reactor system included in the recycling system according to the present teachings.

Referring to FIG. 3., shown is a drawing of one embodiment of a reactor included in the recycling system according to the present teachings.

The reactor 211 may be angled as shown in FIG. 3 such that the reactor input 201 travels down the reactor 211 as a reactor solid 215. The reactor solid 215 travels down the reactor 211 towards the heat source 214. As the reactor solid 215 travels down the reactor 211 chemical reactions may occur whereby the chemical composition of the reactor solid 215 may change depending upon the reactor solid's 215 position within the reactor. The reactor solid 215 reaching the bottom of the reactor 211 falls through a grid system in the bottom of the reactor and may be removed as solid output 213 and used as or in the production of asphalt or cement clinker.

The asphalt produced by the system may be used in the production of infrastructure such as roads and roofing tiles, among other applications. The cement clinker produced by the system may be used in the production of Portland cement for use in concrete production, among other applications.

Depending upon the chemical reactions of the reactor solid 215, various gases may be released into the reactor 211. The gases may travel up the reactor 211 as reactor gas 216. The reactor gas 216 may have a different composition depending upon the chemical reactions taking place in the reactor 211 and position within the reactor 211. A gas gradient may be formed within the reactor gas 216. This gas gradient may promote and/or facilitate different chemical reactions.

The reactor 211 may rotate as shown to promote or facilitate movement of the reactor solid 215 and the reactor gas 216. The rotation may also promote or facilitate various chemical reactions.

Figure 4:
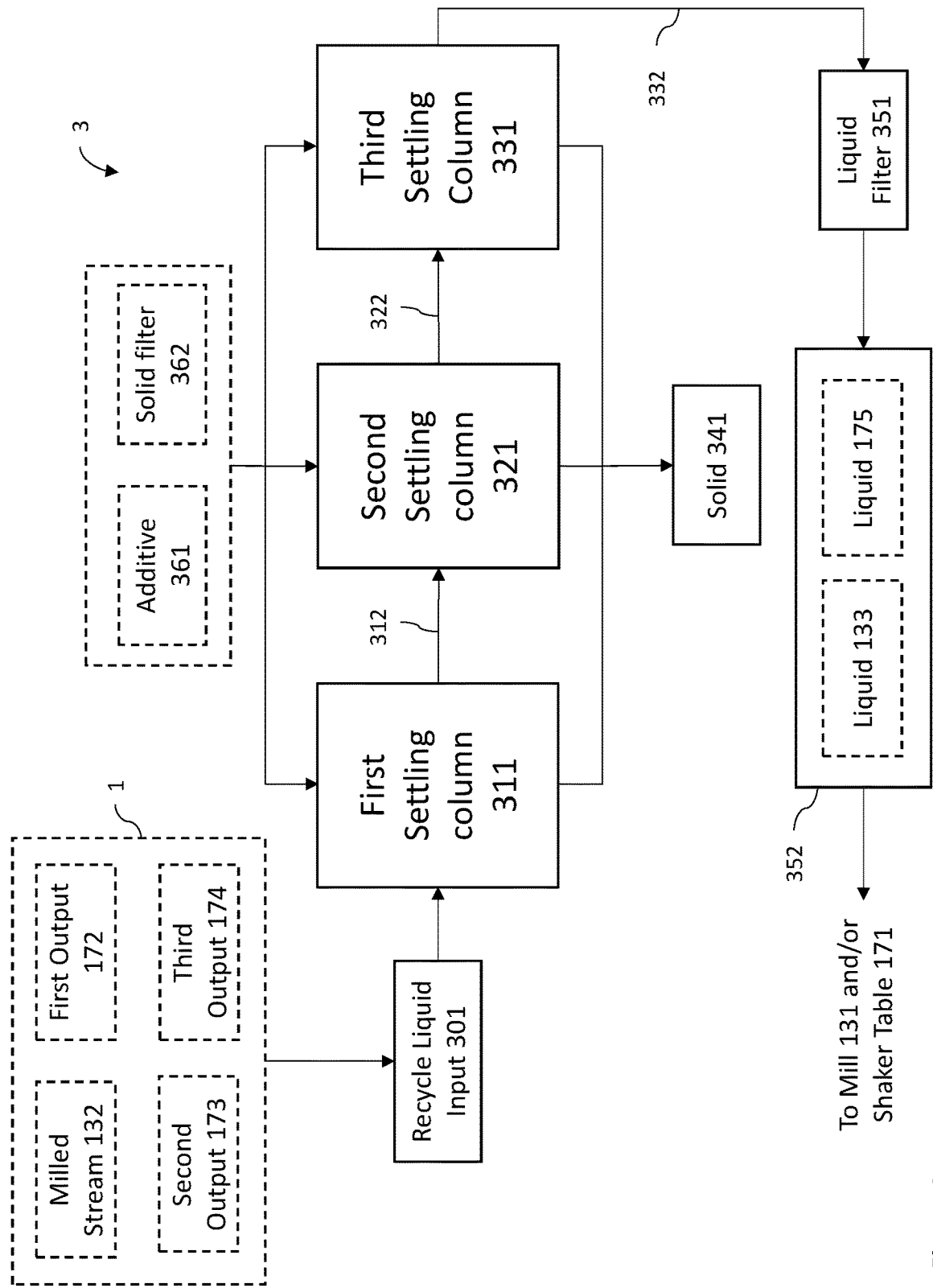
FIG. 4 is a schematic diagram depicting a liquid recycling system included in the recycling system according to the present teachings.

Referring to FIG. 4, shown is one embodiment of a liquid recycle system included in the recycling system according to the present teachings.

The system 3 may include each of the elements of system 1 and system 2 and may also include a first settling column 311. The first settling column 311 may be a distillation column, drum, vat, liquid tank, or any container capable of holding liquids. The first settling column 311 may receive the recycle liquid input 301 and may output a first settled liquid 312 and a solid 341. The recycle liquid input 301 may be liquid from the milled stream 132, the first output 172, the second output 173, and/or the third output 174.

The system 3 may also include a second settling column 321. The second settling column 321 may be a distillation column, drum, vat, liquid tank, or any container capable of holding liquids. The second settling column 321 may receive the first settled liquid 312 and may output a second settled liquid 322 and a solid 341.

The system 3 may also include a third settling column 331. The third settling column 331 may be a distillation column, drum, vat, liquid tank, or any container capable of holding liquids. The third settling column 331 may receive the second settled liquid 322 and may output a third settled liquid 332 and a solid 341.

It is understood that the use of three settling columns is one embodiment of the liquid recycling system and is explained in detail for the purpose of demonstration not limitation. The liquid recycling system may contain as many or as few settling columns as necessary to achieve desired purification of the liquid or precipitation of the solids.

The system 3 may also include a liquid filter 351. The liquid filter 351 may be a screen, cloth, membrane, or any other filter capable of removing impurities from a liquid. The liquid filter 351 may receive the third settled liquid 332 and may output a filtered liquid 352.

The recycle liquid input 301 may be the milled stream 132, the first output 172, the second output 173, the third output 174, and/or any combination of the above including liquid 133 and liquid 175 and/or any stream containing liquid 133 or liquid 175.

The first settling column 311 may receive the recycle liquid input 301 at the height within column 131 whereby the input 301 matches the clarity and turbidity of the first settling column at that height to promote optimal separation. Various factors including, but not limited to, the density and quantity of solids suspended in the liquid, the viscosity of the liquid, the nature of the solids, the flow rate of the recycle liquid input 301, the height of the column 311, and the width of the column 311, may determine the height at which the first settling column 311 receives the recycle liquid input 301. The solids in the recycle liquid input 301 may collect at the bottom of the first settling column 311 and liquid will collect at the top of the first settling column 311. The solids at the bottom of the first settling column may be removed as solid 341. Liquid may be removed from the top of the first settling column 311 as the first settled liquid 312. This process may be repeated in the second settling column 321 and third settling column 331 whereby the second settling column 321 may receive the first settled liquid 312 and may output the second settled liquid 322 and the third settling column 331 may receive the second settled liquid 322 and may output the third settled liquid 332.

The solid 341 may be removed from the system as waste or as a desirable output or used as part of the non-magnetic stream 162 or used as part of the reactor input 201.

The liquid filter 351 may receive the third settled liquid 332 from the third settling column 331 and may remove remaining impurities and output a filtered liquid 352. The filtered liquid 352 may be reused as liquid 133 and liquid 175.

The system 3 may also include an additive 361. The additive 361 may be a detergent, surfactant, agglomeration substance, or any other substance to promote the settling and/or precipitation of solids. The additive 361 may be added to one or more of the settling columns in various amounts as desired to promote the settling of solids in the liquids.

The system 3 may also include a solid filter 362, the solid filter may be a screen, mesh, cloth, porous media, or other filter capable of removing impurities in the liquid. The solid filter 362 may capture various solid particles in the liquid input and may facilitate precipitation of the solids. The solid filter 362 may be included in one of more of the settling columns and may be different in each. The solid filter 362 may be used instead of or in addition to the additives 361.

Figure 5:
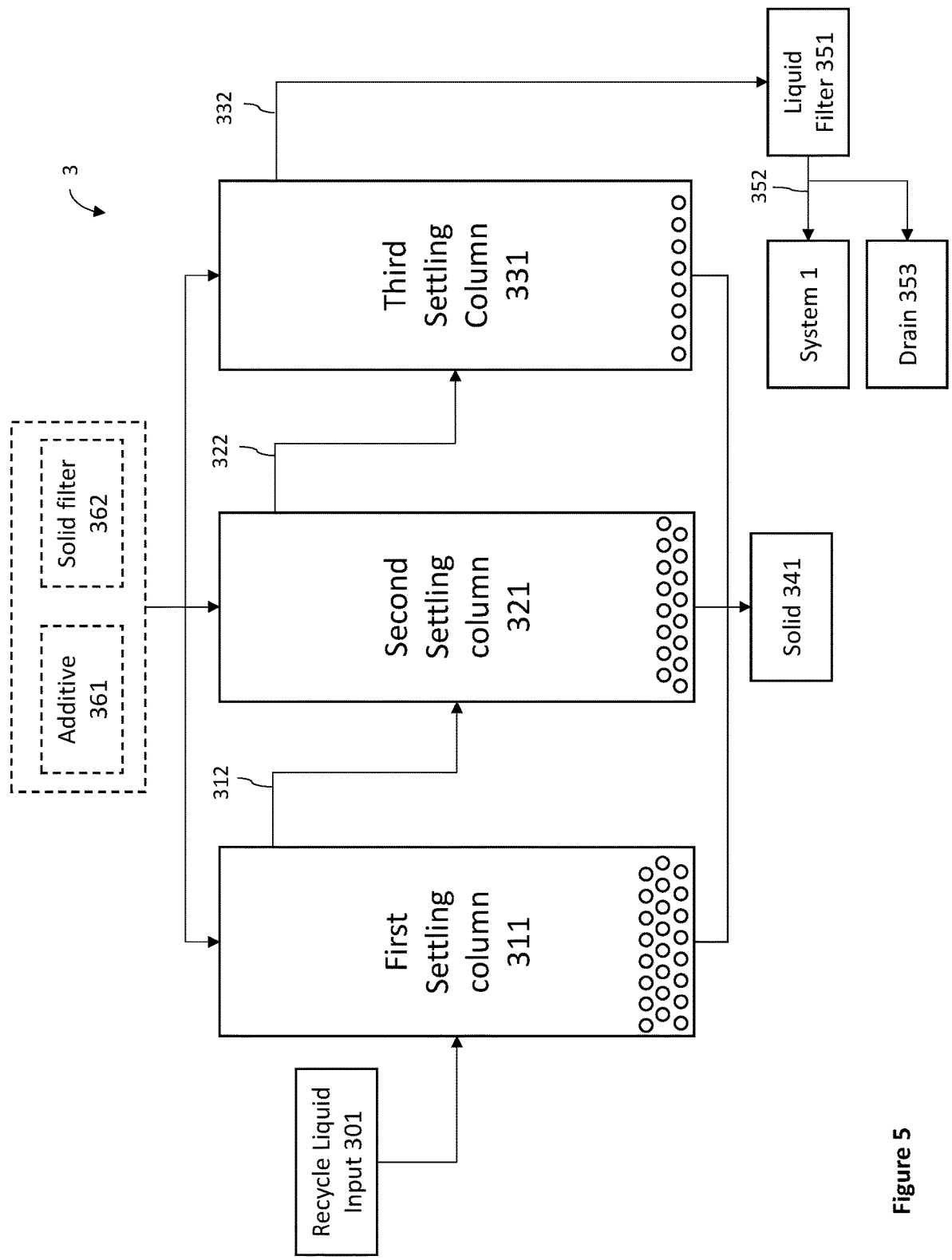
FIG. 5. is a drawing depicting the liquid recycling system included in the recycling system according to the present teachings.

Referring to FIG. 5, shown is a drawing of one embodiment of a liquid recycling system according to the present teachings.

The first settling column 311 may have a clarity gradient along its column whereby the liquid is more clear at the top of the column and less clear at the bottom. The first settling column 311 may receive the recycle liquid 301 at a particular height of the first settling column 311 as shown in FIG. 5 such that the recycle liquid input 301 matches the clarity and turbidity within the column at that height.

The second settling column 321 may have a clarity gradient along its column whereby the liquid is more clear at the top of the column and less clear at the bottom. The second settling column 321 may receive the first settled liquid 312 at a particular height of the second settling column 321 as shown in FIG. 5 such that the first settled liquid 312 matches the clarity and turbidity within the column at that height.

The third settling column 331 may have a clarity gradient along its column whereby the liquid is more clear at the top of the column and less clear at the bottom. The third settling column 331 may receive the second settled liquid 322 at a particular height of the third settling column 331 as shown in FIG. 5 such that the second settled liquid 322 matches the clarity and turbidity within the column at that height.

The liquid filter 351 may receive the third settled liquid 332 and may remove remaining solids and/or any additive 361 in the liquid. The filtered liquid 352 may be reused in system 1 or it may be sent to drain 353 and be reintroduced into the environment.

In one embodiment there may be more solid 341 collected from the first settling column 311 than the second settling column 321 and more solid 341 collected from the second settling column 321 than the third settling column 331.

In one embodiment more additive 361 may be added to the first settling column 311 since the liquid in the first settling column 311 may contain the highest concentration of solids to settle and/or precipitate out. Less additive 361 may be added to the third settling column 331 since the liquid in the third settling column 331 may contain the lowest concentration of solids to settle out.

In one embodiment, the solid filter 362 may be a wire screen in the first settling column 311 since the liquid in the first settling column 311 may contain the highest concentration of solids to settle and/or precipitate out. The solid filter 362 may be a fine mesh in the third settled column 331 since the liquid in the third settling column 331 may contain the lowest concentration of solids to settle out.

Blockchain technologies may be utilized in order to track and trace the inputs, operations, and products associated with the recycling system. Multiple recycling systems and processors may upload data to a distributed blockchain network to record mixed material streams processed including but not limited to their nature and origin, methods of processing at decentralized recycling system sites, and range of products produced and their associated nature and origin. Data may also include supplier and customer information to provide a full lifecycle and cradle to grave analysis of a material, end-product, and new manufactured product.

Information, for example best practices, may be shared on a blockchain network linking recycling systems. Recycling systems may record data manually or electronically on operating conditions, including but not limited to feed rate, product rate, recycle rate, temperatures, pressures, processing times, product and feed quality and characteristics, and other variables. Such data may be transmitted electronically through a blockchain or other means to other recycling systems in the distributed network as a way to share best practices, manage pricing, manage inventory, and enhance efficiency and other optimal modes. Such a neural network enables a web of interconnected actors in a total system. Each recycling system may have sensors, analyzers, indicators, connections to the internet, and/or other components needed to enable such a system. Different actors along a supply/demand chain may also be paid seamlessly in accordance with such a system and in response to conditions monitored and recorded within such a system.

The materials that interact with the elements of the above-described system may be transported manually or automatically between such elements.

The above-described system may fit into a shipping container, or be of relative size, for purposes of transporting the system to specific locations for performing the functions described herein.

The above-described system is designed with simplicity, small plot size and common pieces of equipment in mind such that common pieces of equipment may be replaced, added, or removed as needed. The system comprises and is comprised of modular units, capable of being easily replicated and scaled at various locations.

Although the invention has been illustrated and described herein with reference to a preferred embodiment and a specific example thereof, it will be readily apparent to those of ordinary skill in the art that other embodiments and examples may perform similar functions and/or achieve user experiences. All such equivalent embodiments and examples are within the spirit and scope of the present invention, are contemplated thereby, and are intended to be covered by the disclosure.

In compliance with the statute, the present teachings have been described in language more or less specific as to structural and methodical features. It is to be understood, however, that the present teachings are not limited to the specific features shown and described, since the systems and methods herein disclosed comprise preferred forms of putting the present teachings into effect. The present disclosure is to be considered as an example of the invention and is not intended to limit the invention to a specific embodiment illustrated by the figures above or description below.

For purposes of explanation and not limitation, specific details are set forth such as particular architectures, interfaces, techniques, etc. in order to provide a thorough understanding. In other instances, detailed descriptions of well-known devices, circuits, and methods are omitted so as not to obscure the description with unnecessary detail.

Generally, all terms used are to be interpreted according to their ordinary meaning in the technical field, unless explicitly defined otherwise herein. All references to a/an/the element, apparatus, component, means, step, etc. are to be interpreted openly as referring to at least one instance of the element, apparatus, component, means, step, etc., unless explicitly stated otherwise. The steps of any method disclosed herein do not have to be performed in the exact order disclosed, unless explicitly stated. The use of "first", "second," etc. for different features/components of the present disclosure are only intended to distinguish the features/components from other similar features/components and not to impart any order or hierarchy to the features/components. As used herein, the term "and/or" includes any and all combinations of one or more of the associated listed items.

As used herein, the term "application" is intended to be interchangeable with the term "invention", unless context clearly indicates otherwise.

While the present teachings have been described above in terms of specific embodiments, it is to be understood that they are not limited to these disclosed embodiments. Many modifications and other embodiments will come to mind to those skilled in the art to which this pertains, and which are intended to be and are covered by this disclosure. It is intended that the scope of the present teachings should be determined by proper interpretation and construction of the disclosure and its legal equivalents, as understood by those of skill in the art relying upon the disclosure in this specification and the attached drawings. In describing the invention, it will be understood that a number of techniques and steps are disclosed. Each of these has individual benefits and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification should be read with the understanding that such combinations are entirely within the scope of the invention.

What is claimed is:

1. A system for refining mixed material streams comprising:
   a receptacle for receiving an input stream;
   a drill receiving the input stream, separating materials from the input stream and outputting a processed stream;
   an incinerator incinerating the processed stream to remove organic material and output an incinerated stream;
   a mill grinding the incinerated stream to reduce particle size and output a milled stream;
   a screen having screen holes, the screen filtering the milled stream to remove a first portion having particles sizes larger than the screen holes and to output as a screened stream a second portion having particles sizes smaller than the screen holes;
   a mesh having mesh holes smaller than the screen holes, the mesh filtering the screened stream to output a meshed stream;
   a magnetic device removing magnetic parts from the meshed stream and outputting non-magnetic parts as a non-magnetic stream; and
   a density separator receiving the non-magnetic stream and receiving a liquid, wherein the non-magnetic stream combined with the liquid forms a mixture, and wherein the density separator separates the mixture into at least a first output, a second output having a greater density than the first output, and a third output having a greater density than the second output.

2. The system of claim 1, wherein the receptacle is configured to receive one or more printed circuit boards as the input stream.

3. The system of claim 2, further comprising a decanter that mixes a leachant with the third output and siphons off liquid to produce a decanted solid.

4. The system of claim 3, further comprising a crucible that receives the decanted solid and borax and heats the borax and the decanted solid to separate gold from silica.

5. The system of claim 1, wherein the density separator is configured to supply the third output with gold contained therein.

6. The system of claim 1, wherein the density separator is a shaker table.

7. The system of claim 1, wherein the mill receives the first portion for further grinding for at least 10 minutes.

8. The system of claim 1, further comprising;
   a reactor positioned with a proximal end above a heat source, the reactor receiving a reactor input reactor at a distal end, the reactor reaches higher temperatures at the proximal end, the reactor rotates such that the reactor input moves from the distal end towards the proximal end, the reactor input separating into a gaseous output and a solid output; and
   wherein the reactor input comprises limestone and silica and at least a portion of one of the input stream, the milled stream, the third output, and organic material removed by the drill.

9. The system of claim 8, further comprising:
   a condenser receiving the gaseous output and applying a coolant that condenses the gaseous output into a condensed output; and
   a three-phase separator that separates the condensed output into water, liquid product, and vent gas.

10. The system of claim 9, further comprising:
    an oxidizer, converting the vent gas into an oxidized gas;
    a gas filter, filtering the oxidized gas and outputting a flue gas; and
    an analyzer, measuring the quantitative composition of the flue gas.

11. The system of claim 1, further comprising a water recycling apparatus, which includes:
    a first settling column receiving liquid from at least one of the milled stream, the first output, the second output, and the third output as a liquid input, settling solids out of the liquid input, and outputting a first settled liquid;
    a second settling column receiving the first settled liquid, settling solids out of the first settled liquid, and outputting a second settled liquid;
    a third settling column receiving the second settled liquid, settling solids out of the second settled liquid, and outputting a third settled liquid; and
    a liquid filter removing remaining solids in the third settled liquid to provide a filtered liquid.

12. The system of claim 11, wherein at least one of the first settling column, the second settling column, and the third settling column, receives an additive to facilitate precipitation of solids.

13. The system of claim 11, wherein at least one of the first settling column, the second settling column, and the third settling column includes a solid filter that filters the respective settled liquid.

14. The system of claim 9, further comprising a blockchain processor that tracks movement of the input stream, the first output, the second output, the third output, the liquid product, and the solid output of the system.

15. The system of claim 1, wherein the screen filters the milled stream to remove the first portion having particle sizes larger than 1.4 millimeters; and
    wherein the mesh filters the screened stream to remove a third portion having particle sizes larger than 149 micrometers.

16. A method for refining mixed material streams comprising:
    receiving an input stream;
    drilling the input stream to separate materials from the input stream;
    incinerating the input stream to remove organic material;
    grinding the input stream via a mill to reduce particle size of the input stream;

filtering the input stream via a screen to remove particles having a particle size larger than screen holes of the screen;

further filtering the input stream via a mesh to remove particles having a particle size larger than mesh holes of the mesh;

applying a magnetic field to the input stream via a magnetic device, thereby removing magnetic particles from the input stream; and separating, via a density separator, a mixture of the input stream and a liquid into at least a first output, a second output having a greater density than the first output, and a third output having a greater density than the second output.

17. The method according to claim 16, further comprising:

adding a leachant to the third output to dissolve at least one element thereby producing a refined component;

decanting the leachant and the at least one dissolved element from the refined component;

mixing the refined component with borax in a crucible; and heating the mixture of the refined component and the borax within the crucible to further refine the refined component.

18. The method according to claim 16, further comprising:

after the step of separating the input stream, settling solids out of the liquid from the input stream via a settling column to output a settled liquid;

mixing an additive into the settling column to agglomerate and facilitate precipitation of additional solids from the settled liquid; and filtering the settled liquid to remove the solids, the additional solids, and the additive to output a filtered liquid.

19. The method according to claim 16, wherein said filtering the input stream via the screen comprises removing particles having a particle size larger than 1.4 millimeters; and wherein said further filtering the input stream via the mesh comprises removing particles having a particle size larger than 149 micrometers.

* * * * *